ated Jan. 26, 1971

United States Patent Office

3,558,589
PROCESS FOR DEPOLYMERIZING POLYMERS
Tristram Walker Bethea and Adel Farhan Halasa, Akron, Ohio, assignors to The Firestone Tire & Rubber Company, Akron, Ohio, a corporation of Ohio
No Drawing. Filed Nov. 18, 1968, Ser. No. 776,798
Int. Cl. C08d 5/04; C08f 27/26
U.S. Cl. 260—94.7                    11 Claims

ABSTRACT OF THE DISCLOSURE

Homopolymers of conjugated dienes containing 4 or 5 carbon atoms, including natural rubber, and copolymers thereof with vinyl aromatic compounds, including both emulsion polymers and solution polymers, are depolymerized by treatment with a salt of a transition metal and an organometallic. The reaction may be accelerated by including an olefin. The process is used for lowering the molecular weight of a polymer, particularly a polymer of such high molecular weight that it is difficultly processible. It is also applicable to the removal of gel or other deposit of high molecular weight from a polymerization reactor.

---

This invention relates to reducing the molecular weight of dead homopolymers of a conjugated diene of 4 or 5 carbon atoms, including natural rubber, and copolymers of a plurality of such conjugated dienes, and copolymers of such conjugated dienes with vinyl aromatic monomers, including both emulsion polymers and solution polymers, depolymerizing the polymers to a greater or less extent. It includes the removal of gel or other high molecularweight polymer from a polymerization vessel.

The depolymerization is effected with (1) a salt of a transition metal of Group VI-B, (2) an organometallic of a metal of Groups I-A, II-A, II-B and III-A, and advantageously also (3) an olefin and (4) a proton donor which accelerate the reaction.

The polymers which may be treated according to the process of this invention include the homopolymers of conjugated dienes containing 4 or 5 carbon atoms, including 1,3-butadiene, isoprene, piperylene, and 2,3-dimethyl butadiene and copolymers of any two or more of these, and the copolymers of such conjugated dienes with styrene or other vinyl aromatic monomer.

The salts of the transition metals are preferably chlorides, although other halides (bromides, iodides and fluorides) may be used as well as oxyhalides, sulfates, nitrates, acetonates, acetylacetonates, alkoxides, phosphates, etc. The metal is preferably tungsten although molybdenum and chromium salts may be used. The preferred compound is tungsten hexachloride or molybdenum pentachloride. The salt of the transition metal is preferably added to the reaction mixture before the organometallic.

The organometallic is preferably a derivative of aluminum, e.g. a tri-substituted aluminum in which the substituents are alkyl groups containing 1 to 10 or more carbon atoms and/or aryl groups such as phenyl, tolyl or naphthyl; however, an organo derivative of another metal of Group I-A, II-A, II-B or III-A may be used.

The olefin may comprise a terminal or an internal double bond. However, it is preferred to use an internal olefin. Thus, butene-2 is preferred over butene-1. They may be straight or branched chain compounds. They may comprise 2 to 40 or 50 carbon atoms.

The olefins include, for example, ethylene, propylenes, butenes, pentenes, octenes, decenes, octadecenes, dodecenes, tridecenes, tetradecenes, pentadecenes, etc.

The proton donor is a compound of the formula RyH in which y is oxygen or sulfur and R is hydrogen, an alkyl group, an aryl group, an alkaryl group, an aralkyl group or an alkenyl group in all of which any alkyl group may contain 1 to 20 carbon atoms, and the aryl group may be phenyl or naphthyl. The alkenyl group may contain 3 to 20 carbon atoms. Water is the preferred proton donor. The presence of a proton donor is not necessary, but may speed up the reaction. If water is employed, no more than a small amount should be used because a large quantity may kill the salt of the transition metal (e.g. $WCl_6$) and the organometallic (e.g. $R_3Al$).

The organometallic compounds which may be used include compounds which comprise alkyl groups of 1 to 10 or more carbon atoms, phenyl, naphthyl and methyl and ethyl derivatives of phenyl and naphthyl. Thus they include, for instance: trimethylaluminum, triethylaluminum, tripropylaluminums, tributylaluminums, triamylaluminums, trihexylaluminums, triheptylaluminums, trioctylaluminums, trinonylaluminums, tridecylaluminums, triphenylaluminum, trinaphthylaluminums, tritolylaluminums, trimethylnaphthylaluminums, monoalkylaluminum dihalides, dialkylaluminum halides, monoarylaluminum dihalides, diarylaluminum halides, and the corresponding alkyl and aryl derivatives of lithium, sodium, potassium, rubidium, cesium, beryllium, magnesium, calcium, barium, strontium, zinc, cadmium, gallium, indium and thallium.

These include, for example: methyl lithium, ethyl sodium, propyl potassiums, butyl rubidiums, amyl cesiums, butyl lithiums, phenyl lithium, naphthyl lithiums, dimethyl magnesium, diethyl calcium, dipropyl bariums, diamyl strontiums, dihexyl zincs, dioctyl cadmiums, trinonyl galliums, tridecyl indiums, trimethyl thallium, methyl magnesium halides, ethyl calcium halides, propyl zinc halides, butyl cadmium halides, amyl gallium halides, hexyl indium halides, heptyl thallium halides, octyl beryllium halides, phenyl barium halides, naphthyl strontium halides.

The salts of the transition metals include, for example: molybdenum pentachloride, molybdenum pentafluoride, molybdenum hexabromide, molybdenum dichloride, molybdenum oxytetrabromide, molybdenum nitrate, molybdenum acetylacetonate, molybdenum sulfate, molybdenum phosphate, molybdenum pentaethoxide, tungsten dichloride, tungsten pentabromide, tungsten hexafluoride, tungsten oxytetrachloride, tungsten sulfate, chromous chloride, chromic chloride, chromous nitrate, chromic nitrate, chromium oxychloride, chromium orthophosphate, chromous sulfate, chromic sulfate, etc.

The molar ratio of the amount of the organometallic compound to the salt of the transition metal may be varied from about 0.1 to 10, but usually substantially equal molar quantities of the two components will be used. About 0.01 to 10 millimoles of each of the two components will be used for each 100 grams by weight of the polymer being treated. Usually, about 1 to 3 millimoles will be found satisfactory.

The proton donors which may be added to the catalyst supply acid protons which may produce a synergistic effect, speeding up the reaction. They include, for example: water, alcohols (e.g. methanol, ethanol, benzyl alcohol, etc.), phenols (e.g. phenol, naphthol, toluol, etc.), hydrogen sulfide, methyl sulfide, octyl sulfide, methyl mercaptan, hexylhydroperoxide, heptylhydrodisulfide, hydroquinone, allyl alcohol, t-butylcatechol, alpha-naphthyl alcohol, thiophenol, 4 - methylthiophenol, 4-mercaptophenol, cumyl hydroperoxide, t-butylhydroperoxide, cumyl hydrodisulfide, t-butylhydrodisulfide, ethyleneglycol, resorcinol, pyrogallol, 1,4 - dithiobenzene, 1 - hydroxy - 4-thiobenzene, etc.

The molar amount of proton donor that is used may be just a trace, but may be about equal to the molar amounts of the organometallic and the transition metal salt components if this does not kill the catalyst. Thus, one may use 0.1 to 10, and preferably 1 to 5 millimoles of proton donor for 100 grams of the polymer treated.

The catalyst components may be added separately to the reaction mixture, or they may be previously mixed and allowed to stand and react with one another prior to addition to the reaction mixture. The process is carried out in diluent with agitation.

The following examples are illustrative:

EXAMPLE 1

Into a standard stainless steel reactor 1500 g. of a 26% butadiene in hexane solution (390 g., 7.22 mole butadiene) were charged at room temperature. Polymerization of the butadiene was initiated by n-butyllithium (3.61 mmoles) and the temperature of the reactor and its contents was raised to 70° C. After three hours the pressure in the reactor ceased to drop, indicating that the polymerization was completed. The carbon-lithium bonds were hydrolyzed by the addition of 86.9 ml. of benzene saturated with (3.23 mmole $H_2O$) water. A sample of the polymer (designated Sample 1) was taken and the remainder in the reactor was cooled to room temperature.

A mixture of cis- and trans-butene-2, 720 g. (12.9 moles), was added to the polymer in the reactor. Then 56.6 ml. of a 0.1 M solution of tungsten hexachloride in benzene was injected and after this was stirred in well 7.98 ml. of a 0.7 M solution of triisobutylaluminum in heptane was injected and stirred in well. The reactor and its contents were heated with efficient stirring to 50° C. A sample of the polymer was taken when the contents reached 50° C. (Sample 2), and further samples one-half hour later (Sample 3) and 16 hours later (Sample 4). In the following table, the times when the various samples were taken is recorded together with their viscosities and their stereo-compositions, i.e. the content of cis-1,4, trans-1,4 and 1,2 polymers. No gel was formed in any of the samples.

| Sample | Time | DSV | Percent cis-1,4 | Percent trans-1,4 | Percent 1,2 |
|---|---|---|---|---|---|
| 1 | | 2.20 | 35.9 | 54.2 | 9.9 |
| 2 | (1) | 0.76 | 20.8 | 69.7 | 9.5 |
| 3 | 30 min.[2] | 0.58 | 17.8 | 72.7 | 9.5 |
| 4 | 16 hrs.[2] | 0.37 | 14.6 | 76.3 | 9.2 |

[1] The time it took to heat to 50° C.
[2] Times after heating to 50° C.

As the polymer was depolymerized a substantial portion of the cis-1,4 content was converted to trans-1,4. It is thought that this is influenced by the proton donor.

EXAMPLE 2

Example 1 was repeated except that only 19.5 grams (0.35 mole) of mixed cis- and trans- butene-2 was added. The results are recorded in the following table. Each example was heated to 50° C. No gel was formed.

| Sample | Time[1] | DSV | Percent cis-1,4 | Percent trans-1,4 | Percent 1,2 |
|---|---|---|---|---|---|
| 1 | | 2.20 | | | |
| 2 | | 0.78 | | | |
| 3 | 1 hr | 0.57 | 14.9 | 77.8 | 7.3 |
| 4 | 2 hrs | 0.51 | 15.2 | 77.8 | 7.0 |

[1] Times after heating to 50° C.

The change in viscosity indicates that with the small amount of butenes depolymerization proceeded at substantially the same rate as with the larger amount used in Example 1.

EXAMPLE 3

The process was used to remove the gel (high molecular weight polymer) formed in a reactor during prior production of polybutadiene.

The reactor in question was a 50-gallon reactor. Approximately 15 pounds of gel had accumulated in the dish of the reactor in a recent run in which butadiene was polymerized in solution with no-butyllithium.

The depolymerization was carried out in the following manner: First, several gallons of hexane were charged to the reactor. This was followed by 15 pounds of cis- and trans-butene-2, equivalent to the amount of gel present. The catalysts, 650 ml. tungsten hexachloride (65 mmoles) and 95 ml. triisobutylaluminum (65 mmoles) were next charged separately, in this order. The reaction mixture was kept under agitation (110 r.p.m.) and water was circulated through the reactor jacket to keep the reactor at about 70 to 158° F. A sample removed less than an hour later was a lumpy, "stringy" cement.

The depolymerization was allowed to continue overnight. The reactor was then filled with hexene and allowed to agitate for several hours, before dropping the contents. The reactor was washed once with hexane. On inspection it was found to be clean except for several small pieces of gel at various points in the reactor, easily removed on further treatment.

The depolymerization need not be continued overnight. With addition of solvent and agitation, reactors can be cleaned in much less time than is required by present methods.

EXAMPLE 4

A 21% solution (3700 grams) of butadiene in heptane was placed in the reactor. Then 3.0 ml. of n-butyllithium (4.7 mmoles, i.e. 1 mmole for each 210 grams of butadiene plus an excess for reaction with surreptitious impurities). The reaction mixture was heated to 70° C. (158° F.) and the reaction was continued until the pressure no longer dropped. The reactor was then cooled to room temperature. Then 0.05837 ml. of ethanol was added for each mmole of n-butyllithium used for the polymerization (0.31) ml.) to kill the reaction. A sample of the dead polymer cement was taken.

Then 10 ml. of tungsten hexachloride ($WCl_6$) solution was added for each mmole of n-butyllithium (37 ml.) and a second sample was taken. Then 1.45 ml. of triisobutylaluminum (i-$Bu_3Al$) was added for each 10 ml. of the tungsten hexachloride solution used (5.4 ml.). The reaction was continued for 90 minutes. Samples were taken each minute for the first ten minutes and then less often, as shown in the following table. As indicated the times of taking the later samples are recorded as the number of minutes after addition of i-$Bu_3Al$.

TABLE 4a

| Sample No.: | Min. after i-$Bu_3Al$ |
|---|---|
| 1 | Dead cement |
| 2 | $WCl_6$ only |
| 3 | 1 |
| 4 | 2 |
| 5 | 3 |
| 6 | 4 |
| 7 | 5 |
| 8 | 6 |
| 9 | 7 |
| 10 | 8 |
| 11 | 9 |
| 12 | 10 |
| 13 | 20 |
| 14 | 90 |

The progress of the reaction was followed by noting the change in viscosity, as recorded in the following table.

TABLE 4b

| Sample No.: | DSV |
|---|---|
| 1 | 1.91 |
| 2 | 1.84 |
| 3 | 1.48 |
| 4 | 1.43 |
| 5 | 1.31 |
| 6 | 1.26 |
| 7 | 1.22 |
| 8 | 1.22 |
| 9 | 1.17 |

TABLE 4b—Continued

| Sample No.: | DSV |
|---|---|
| 10 | 1.16 |
| 11 | 1.09 |
| 12 | 1.15 |
| 13 | 0.86 |
| 14 | 0.52 |

Ethanol was present as a proton donor but no appreciable change occurred in the stereocomposition of the polymer, as shown in the following table.

TABLE 4c

| Sample No. | Cis-1,4 | Trans-1,4 | 1,2 | Total found |
|---|---|---|---|---|
| 1 | 31.6 | 56.1 | 12.3 | 95.6 |
| 2 | 30.3 | 57.1 | 12.6 | 95.5 |
| 3 | 31.4 | 56.2 | 12.5 | 95.4 |
| 4 | 31.1 | 56.4 | 12.5 | 95.3 |
| 5 | 31.2 | 56.3 | 12.4 | 96.1 |
| 6 | 32.1 | 55.6 | 12.3 | 96.2 |
| 7 | 32.2 | 55.5 | 12.3 | 95.7 |
| 8 | 33.5 | 54.4 | 12.1 | 97.5 |
| 9 | 32.7 | 55.1 | 12.2 | 96.4 |
| 10 | 30.6 | 56.9 | 12.5 | 94.3 |
| 11 | 30.6 | 56.9 | 12.5 | 94.4 |
| 12 | 33.3 | 54.6 | 12.1 | 97.3 |
| 13 | 33.4 | 54.6 | 12.0 | 97.4 |

EXAMPLE 5

Gel remaining from the emulsion production of butadienestyrene copolymer has been removed from the production vessel; it has also been depolymerized in laboratory equipment. Details of the latter follow.

Thirty grams of emulsion gel in about 750 ml. benzene were heated, the water removed, and then it was cooled. Fifty ml. of cis-2-pentene was added and the reaction mixture was stirred slowly. One hundred twenty ml. of 0.1 molar tungsten chloride was added before the reaction mixture turned dark, indicating that unreacted $WCl_6$ was present. Then 3 ml. of i-$Bu_3Al$ was added at room temperature. On stirring the reaction mixture was originally very sluggish, but became eased after 2 or 3 hours. The mixture was stirred overnight, and the next day about 50 ml. more 2-pentene, 30 ml. $WCl_6$ and 3 ml. i-$Bu_3Al$ were added with continued stirring. After several hours, stirring was accomplished with greater ease.

Polyisoprene and the other polymers and copolymers are depolymerized by a similar procedure. The polymers and copolymers need not be produced by lithium polymerization, as in the first four examples, but other methods of polymerization may be used including emulsion polymerization and mass polymerization. Such polymers would have quite different stereo-compositions, but can be depolymerized according to the process of this invention.

In the depolymerization, one will employ 0.1 to 10 and preferably 1 to 10 millimoles of the salt of a transition metal with 0.1 to 10 and preferably 1 to 10 millimoles of an organometallic and 0.1 to 100 and preferably 1 to 10 millimoles of an olefin per 100 grams of the polymer.

We claim:

1. The method of depolymerizing a dead rubber polymer of the class consisting of homopolymers and copolymers of conjugated dienes having 4 or 5 carbon atoms and copolymers of such a conjugated diene with a vinyl aromatic monomer, wherein the improvement comprises treating the same in diluent at a temperature between about room temperature and 85° C. with agitation, with 0.1 to 10 millimoles of a salt of a transition metal of the class consisting of tungsten hexachloride and molybdenum pentachloride and then with 0.1 to 10 millimoles of a trialkyl aluminum in which the alkyl group contains 1 to 10 carbon atoms per 100 grams of the polymer in the presence of 1 to 10 millimoles of an olefin of the class consisting of 2-butenes and 2-pentenes.

2. The method of claim 1 which includes depolymerizing with 0.1 to 10 millimoles of a proton donor of the class consisting of water and ethanol per 100 grams of the polymer.

3. The method of claim 2 in which the proton donor is water.

4. The method of claim 1 in which polybutadiene is depolymerized.

5. The method of claim 1 in which the salt of the transition metal is tungsten hexachloride.

6. The method of claim 1 in which the organometallic is tri-isobutylaluminum.

7. The method of claim 1 in which the olefin is a mixture of cis- and trans-butene-2.

8. The method of claim 1 in which polybutadiene is treated with 0.01 to 10 millimoles of tungsten hexachloride, 0.01 to 10 millimoles of tri-isobutylaluminum and 1 to 10 millimoles of a mixture of 2-butenes per 100 grams of the polymer and water is present as proton donor.

9. The method of claim 1 carried out in a reactor in which insoluble higher molecular weight polymer produced in the reactor during the production of lower molecular weight polymer therein is depolymerized and thereby solubilized.

10. The method of claim 9 in which the higher molecular weight polymer is polybutadiene gel and 1 to 10 millimoles of an olefin of the class consisting of 2-butenes and 2-pentenes is present per 100 grams of gel and 0.1 to 10 millimoles of water is present per 100 grams of the gel.

11. The method of lowering the molecular weight of a dead rubber polymer or copolymer of conjugated dienes containing 4 or 5 carbon atoms or a copolymer thereof with a vinyl aromatic monomer, wherein the improvement comprises treating the same in the temperature range of room temperature to substantially 85° C. in diluent with 0.01 to 10 millimoles of a salt of a transition metal of the class consisting of tungsten hexachloride and molybdenum pentachloride and then with 0.01 to 10 millimoles of a trialkyl aluminum in which the alkyl group contains 1 to 10 carbon atoms in the presence of 1 to 10 millimoles of an olefin of the class consisting of 2-butenes and 2-pentenes and 0.1 to 10 millimoles of water.

References Cited

UNITED STATES PATENTS

| 3,223,693 | 12/1965 | Farrar | 260—94.3 |
| 3,278,441 | 10/1966 | Manuel et al. | 260—94.7X |
| 3,437,649 | 4/1969 | Mueller | 260—94.7 |

OTHER REFERENCES

Molecular Weight Jump Reaction by Engel, Schafer and Kiepert, Rubber Age, December 1964, pp. 410–415.

JAMES A. SEIDLECK, Primary Examiner

W. F. HAMROCK, Assistant Examiner

U.S. Cl. X.R.

260—85.1, 96